US012580109B2

(12) United States Patent
Oya

(10) Patent No.: US 12,580,109 B2
(45) Date of Patent: Mar. 17, 2026

(54) SUPERCONDUCTING COIL

(71) Applicant: Canon Medical Systems Corporation, Tochigi (JP)

(72) Inventor: Masayoshi Oya, Tokyo (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 958 days.

(21) Appl. No.: 17/782,189

(22) PCT Filed: Feb. 3, 2020

(86) PCT No.: PCT/JP2020/003960

§ 371 (c)(1),
(2) Date: Jun. 3, 2022

(87) PCT Pub. No.: WO2021/156917

PCT Pub. Date: Aug. 12, 2021

(65) Prior Publication Data

US 2023/0005648 A1 Jan. 5, 2023

(51) Int. Cl.

*H01F 6/06* (2006.01)
*H01F 6/02* (2006.01)

(52) U.S. Cl.

CPC *H01F 6/06* (2013.01); *H01F 6/02* (2013.01)

(58) Field of Classification Search

CPC ........................................................ H01F 6/06
See application file for complete search history.

(56) References Cited

U.S. PATENT DOCUMENTS

| | | | | |
|---|---|---|---|---|
| 5,721,180 A * | 2/1998 | Pike | B32B 5/26 442/364 |
| 5,729,267 A * | 3/1998 | Shimada | B41J 2/385 347/112 |
| 2014/0110153 A1* | 4/2014 | Kashiwagi | C22C 12/00 174/251 |
| 2014/0357492 A1* | 12/2014 | Daibo | H01F 5/02 505/211 |

FOREIGN PATENT DOCUMENTS

| | | | | |
|---|---|---|---|---|
| JP | 2-95206 U | | 7/1990 | |
| JP | H04-042510 A | | 2/1992 | |
| JP | 06-151168 | * | 5/1994 | H01F 7/22 |

(Continued)

OTHER PUBLICATIONS

Office Action issued Apr. 28, 2025 in Chinese Patent Application No. 202080094873.7, 8 pages.

(Continued)

*Primary Examiner* — Paul A Wartalowicz
(74) *Attorney, Agent, or Firm* — XSENSUS LLP

(57) ABSTRACT

A superconducting coil comprises a superconducting wire, an insulating sheet, and an adhesive resin. The insulating sheet includes a plurality of resin sheets and two semi-cured resin fiber sheets. The plurality of resin sheets have electrical insulation and are disposed in at least two layers. The two semi-cured resin fiber sheets are disposed in layers with the plurality of resin sheets disposed therebetween. The plurality of resin sheets and the two semi-cured resin fiber sheets have mutually adjacent resin and semi-cured resin fiber sheets bonded together.

16 Claims, 3 Drawing Sheets

(56) References Cited

FOREIGN PATENT DOCUMENTS

| | | | |
|---|---|---|---|
| JP | 2006-120828 | A | 5/2006 |
| JP | 4607540 | B2 | 1/2011 |
| JP | 2014-22693 | A | 2/2014 |
| JP | 2015-012199 | A | 1/2015 |

OTHER PUBLICATIONS

International Search Report and Written Opinion mailed on Apr. 21, 2020, received for PCT Application PCT/JP2020/003960, Filed on Feb. 3, 2020, 8 pages including English Translation.

* cited by examiner

SUPERCONDUCTING COIL

CROSS-REFERENCE TO RELATED APPLICATION

The present application is based on PCT filing PCT/JP2020/003960, filed Feb. 3, 2020, the entire contents of which are incorporated herein by reference.

TECHNICAL FIELD

The present disclosure relates to a superconducting coil.

BACKGROUND ART

As a prior art document, Japanese Patent No. 4607540 (PTL 1) discloses a configuration of a superconducting coil. The superconducting coil disclosed in PTL 1 includes a superconducting wire, an insulating sheet, and an adhesive resin. The insulating sheet has a surface subjected to treatment to facilitate adhesion.

CITATION LIST

Patent Literature

[PTL 1] Japanese Patent No. 4607540

SUMMARY OF INVENTION

Technical Problem

When the superconducting coil is cooled, cooling stress is generated due to a thermal shrinkage difference between the adhesive resin and the insulating sheet. When the superconducting coil is excited, electromagnetic stress is generated. When the cooling stress or the electromagnetic stress causes cracking and peeling at an interface between the adhesive resin and the insulating sheet and hence generates heat, there is a possibility that the heat may be transferred to the superconducting wire and quenching may be caused.

An object of the present disclosure is to provide a superconducting coil that can suppress quenching.

Solution to Problem

A superconducting coil according to the present disclosure comprises a superconducting wire, an insulating sheet, and an adhesive resin. The superconducting wire is wound by a plurality of turns and in a plurality of layers. The insulating sheet is disposed across the plurality of turns of the superconducting wire between the layers of the superconducting wire. The adhesive resin is introduced between the superconducting wire and the insulating sheet. The insulating sheet includes a plurality of resin sheets and two semi-cured resin fiber sheets. The plurality of resin sheets have electrical insulation and are disposed in at least two layers. The two semi-cured resin fiber sheets are disposed in layers with the plurality of resin sheets disposed therebetween. The plurality of resin sheets and the two semi-cured resin fiber sheets have mutually adjacent resin and semi-cured resin fiber sheets bonded together.

Advantageous Effects of Invention

According to the present disclosure, an insulating sheet has two semi-cured resin fiber sheets disposed in layers with a plurality of resin sheets disposed therebetween, and has mutually adjacent resin and semi-cured resin fiber sheets bonded together. This can suppress peeling and cracking at an interface between adhesive resin and the insulating sheet, and also prevent easy transfer of heat to the superconducting wire and thus suppress quenching.

DESCRIPTION OF EMBODIMENTS

Hereinafter, a superconducting coil according to each embodiment will be described with reference to the drawings. In the following embodiments, identical or equivalent components are identically denoted and will not be described repeatedly.

In each figure, a direction DR1 is a direction parallel to a direction along a winding axis of the superconducting coil. A direction DR2 is a direction perpendicular to the direction along the winding axis of the superconducting coil.

First Embodiment

Figure 1:
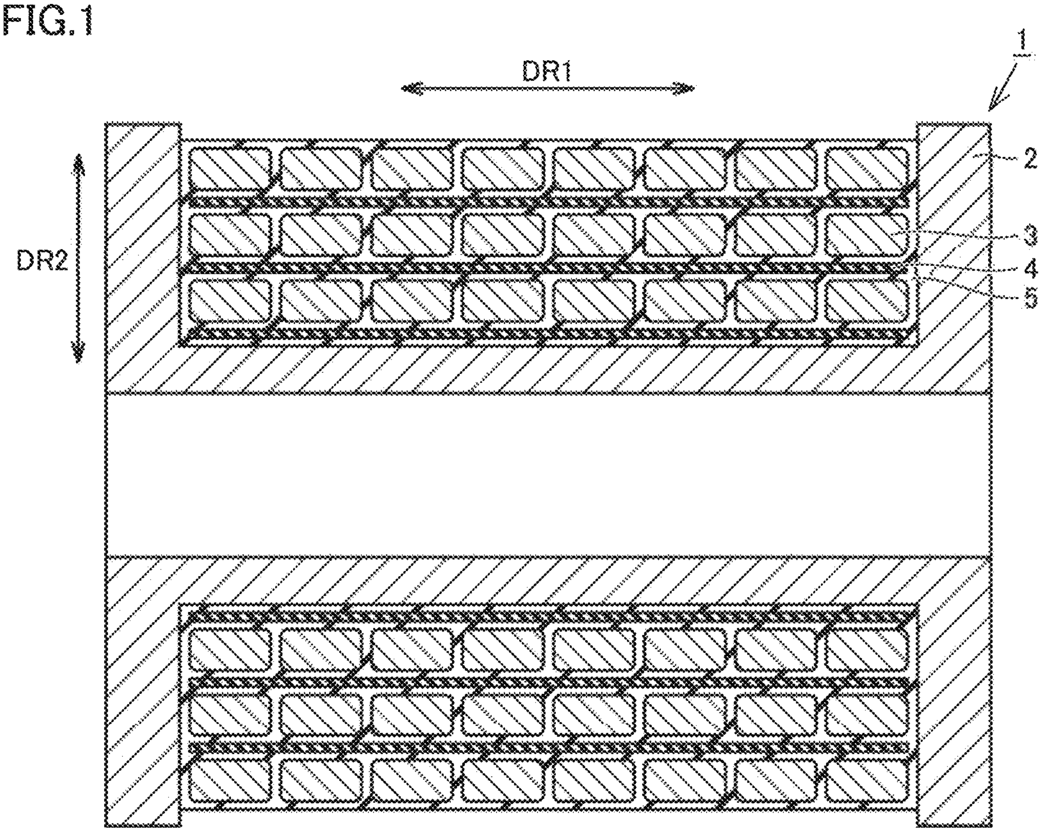
FIG. 1 is a longitudinal cross section of a configuration of a superconducting coil according to a first embodiment.
Figure 2:
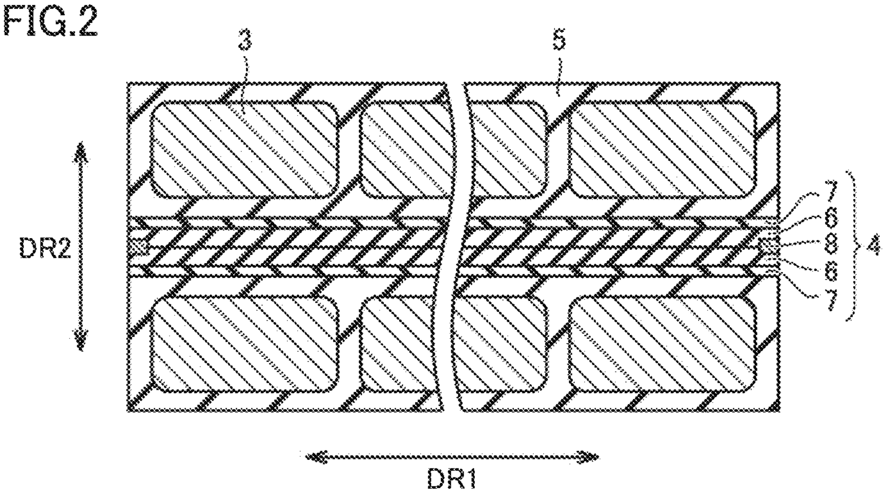
FIG. 2 is a longitudinal cross section of a configuration of an insulating sheet obtained by enlarging a portion between layers of a superconducting wire of the superconducting coil according to the first embodiment.

FIG. 1 is a longitudinal cross section of a configuration of a superconducting coil according to a first embodiment. FIG. 2 is a longitudinal cross section of a configuration of an insulating sheet obtained by enlarging a portion between layers of a superconducting wire of the superconducting coil according to the first embodiment.

As shown in FIGS. 1 and 2, superconducting coil 1 includes a winding frame 2, a superconducting wire 3, an insulating sheet 4, and an adhesive resin 5. Winding frame 2 is a cylinder having opposite ends flanged. Winding frame 2 is formed of stainless steel or the like.

Superconducting wire 3 is wound on a circumference of the cylinder of winding frame 2 excluding the flange by a plurality of turns in direction DR1 and in a plurality of layers in direction DR2. Superconducting wire 3 is formed of NbTi or $Nb_3Sn$. Superconducting wire 3 has a surface coated with an insulating coating.

Insulating sheet 4 is disposed between layers of superconducting wire 3 across the plurality of turns of superconducting wire 3. Insulating sheet 4 is disposed between winding frame 2 and superconducting wire 3 across the plurality of turns of superconducting wire 3.

Adhesive resin 5 such as epoxy resin is introduced between superconducting wire 3 and insulating sheet 4.

Adhesive resin 5 bonds superconducting wires 3 together and bonds superconducting wire 3 and insulating sheet 4 together.

Insulating sheet 4 includes a plurality of resin sheets and two semi-cured resin fiber sheets 7. The plurality of resin sheets have electrical insulation and are disposed in at least two layers. Two semi-cured resin fiber sheets 7 are disposed in layers with the plurality of resin sheets disposed therebetween.

In the present embodiment, the plurality of resin sheets are two plastic sheets 6. That is, the plurality of resin sheets include plastic sheet 6. Note, however, that the resin sheet is not limited to a plastic sheet. Further, the plurality of resin sheets are not limited to two resin sheets, and may be three or more resin sheets.

As described above, in the present embodiment, insulating sheet 4 includes two plastic sheets 6 disposed in layers and two semi-cured resin fiber sheets 7 disposed in layers with two plastic sheets 6 disposed therebetween. Two semi-cured resin fiber sheets 7 constitute opposite outer surface layers of insulating sheet 4.

Plastic sheet 6 is made for example of polyester or polyethylene terephthalate. A single plastic sheet 6 is, for example, several tens μm to several hundreds μm in thickness.

Semi-cured resin fiber sheet 7 is formed by semi-curing epoxy resin with which glassy cloth or kraft paper having a thickness of about several tens μm to several hundreds μm is impregnated.

Two plastic sheets 6 and two semi-cured resin fiber sheets 7 have mutually adjacent plastic and semi-cured resin fiber sheets 6 and 7 bonded together in a known bonding method.

Plastic sheets 6 adjacent to each other as they are disposed in layers are bonded together only at an end portion thereof in a direction along a winding axis of superconducting coil 1 (i.e., direction DR1). In the present embodiment, mutually adjacent plastic sheet 6 and semi-cured resin fiber sheet 7 are bonded together with an adhesive. Therefore, as shown in FIG. 2, plastic sheets 6 are bonded together by an adhesive portion 8 located at an end portion of the sheets in the direction along the winding axis of superconducting coil 1 (or direction DR1).

Plastic sheets 6 adjacent to each other as they are disposed in layers have fluorocarbon resin applied at a portion having plastic sheets in contact with each other as they are disposed in layers. The fluorocarbon resin is, for example, Teflon (registered trademark). The fluorocarbon resin is not applied to the portion to which the adhesive is applied.

Hereinafter, a method for manufacturing superconducting coil 1 according to the first embodiment will be described. Insulating sheet 4 is wound on a circumference of the cylinder of winding frame 2 excluding the flange. Plastic sheets 6 disposed one on another in layers and constituting insulating sheet 4 are bonded together by adhesive portion 8 at an end portion of the sheets in the direction along the winding axis of superconducting coil 1 (or direction DR1). Semi-cured resin fiber sheet 7 of insulating sheet 4 in contact with winding frame 2 that is located on a radially inner side is not necessarily provided.

On an outer circumference of insulating sheet 4 wound on winding frame 2, superconducting wire 3 is wound by a plurality of turns and in a plurality of layers. In doing so, insulating sheet 4 is disposed between layers of superconducting wire 3. Thereafter, vacuum impregnation or the like is employed to introduce and cure adhesive resin 5 in a gap between superconducting wire 3 and insulating sheet 4. As adhesive resin 5 cures, semi-cured resin fiber sheet 7 thoroughly cures, and semi-cured resin fiber sheet 7 and adhesive resin 5 are bonded together. As a result, insulating sheet 4 and adhesive resin 5 can be firmly bonded together.

Superconducting coil 1 of the first embodiment that comprises insulating sheet 4 having two semi-cured resin fiber sheets 7 disposed in layers with two plastic sheets 6 disposed therebetween can have insulating sheet 4 and adhesive resin 5 firmly bonded together, and thus suppress peeling and cracking at an interface between insulating sheet 4 and adhesive resin 5. Even if plastic sheets 6 should produce friction and hence heat, semi-cured resin fiber sheet 7 posed between superconducting wire 3 and plastic sheet 6 can prevent easy transfer of heat to superconducting wire 3 and thus suppress quenching.

Plastic sheets 6 adjacent to each other as they are disposed in layers are bonded together only at an end portion thereof in the direction along the winding axis of superconducting coil 1 (i.e., direction DR1), and entry of adhesive resin 5 between plastic sheets 6 can be suppressed. This can suppress bonding plastic sheets 6 together by adhesive resin 5 and keep small adhesive strength between plastic sheets 6. When cooling stress or electromagnetic stress acts in superconducting coil 1 and strain is generated in superconducting coil 1, plastic sheets 6 can be easily peeled off from each other to release the strain and thus suppress accumulation of large strain energy in superconducting coil 1. This can in turn suppress release of otherwise accumulated strain energy as heat resulting in quenching.

Fluorocarbon resin is applied to a portion of plastic sheets 6 in contact with each other as they are disposed in layers, and if adhesive resin 5 should enter between plastic sheets 6, the fluorocarbon resin that is present between plastic sheet 6 and adhesive resin 5 allows small adhesive strength to be maintained between plastic sheets 6. When cooling stress or electromagnetic stress acts in superconducting coil 1 and strain is generated in superconducting coil 1, plastic sheets 6 can be easily peeled off from each other to release the strain and thus suppress accumulation of large strain energy in superconducting coil 1. This can in turn suppress release of otherwise accumulated strain energy as heat resulting in quenching.

For superconducting coil 1 of the first embodiment, prepreg sheets stuck together can be used as insulating sheet 4 to manufacture superconducting coil 1 without undergoing a complicated process such as welding insulating sheet 4 and adhesive resin 5 together, and thus allow superconducting coil 1 to be manufactured at a reduced cost.

Second Embodiment

Hereinafter, a superconducting coil according to a second embodiment will be described. The superconducting coil according to the second embodiment differs from superconducting coil 1 according to the first embodiment only in that the resin sheet is formed of a cured resin fiber sheet, and accordingly, any configuration similar to that of superconducting coil 1 according to the first embodiment will not be described repeatedly.

Figure 3:
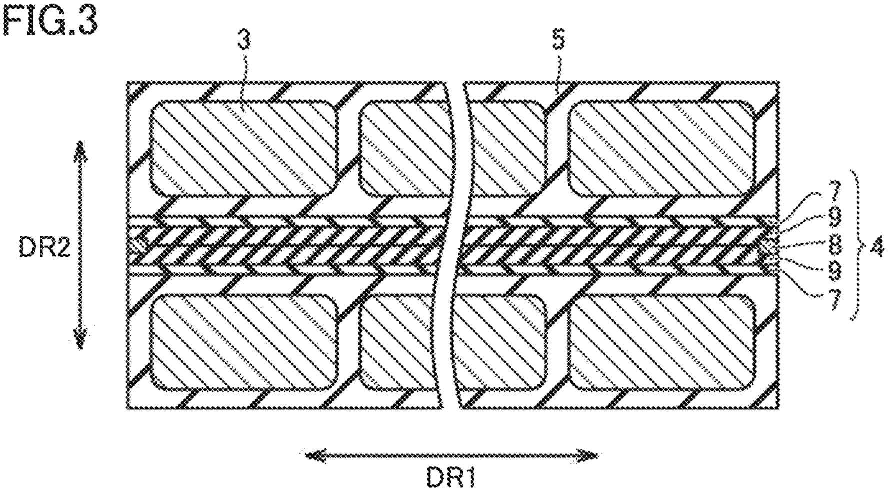
FIG. 3 is a longitudinal cross section of a configuration of an insulating sheet obtained by enlarging a portion between layers of a superconducting wire of a superconducting coil according to a second embodiment.

FIG. 3 is a longitudinal cross section of a configuration of an insulating sheet obtained by enlarging a portion between layers of a superconducting wire of the superconducting coil according to the second embodiment. In the present embodiment, the plurality of resin sheets are two cured resin fiber sheets 9. That is, the plurality of resin sheets include cured resin fiber sheet 9. Note, however, that the resin sheet is not limited to the cured resin fiber sheet. Further, the plurality of resin sheets are not limited to two resin sheets, and may be three or more resin sheets.

As described above, in the present embodiment, insulating sheet 4 includes two cured resin fiber sheets 9 disposed in layers and two semi-cured resin fiber sheets 7 disposed in layers with two cured resin fiber sheets 9 disposed therebetween.

Cured resin fiber sheet 9 is formed by completely curing epoxy resin with which glassy cloth or kraft paper having a thickness of about several tens μm to several hundreds μm is impregnated.

Two cured resin fiber sheets 9 and two semi-cured resin fiber sheets 7 have mutually adjacent cured and semi-cured resin fiber sheets 9 and 7 bonded together in a known bonding method.

Cured resin fiber sheets 9 adjacent to each other as they are disposed in layers are bonded together only at an end portion thereof in the direction along the winding axis of the superconducting coil (i.e., direction DR1). In the present embodiment, mutually adjacent cured resin fiber sheet 9 and semi-cured resin fiber sheet 7 are bonded together with an adhesive. Therefore, as shown in FIG. 3, cured resin fiber sheets 9 are bonded together by adhesive portion 8 located at an end portion of the sheets in the direction along the winding axis of the superconducting coil (or direction DR1).

Superconducting coil 1 of the second embodiment that comprises insulating sheet 4 having two semi-cured resin fiber sheets 7 disposed in layers with two cured resin fiber sheets 9 disposed therebetween can have insulating sheet 4 and adhesive resin 5 firmly bonded together, and thus suppress peeling and cracking at an interface between insulating sheet 4 and adhesive resin 5. Even if cured resin fiber sheets 9 should produce friction and hence heat, semi-cured resin fiber sheet 7 posed between superconducting wire 3 and cured resin fiber sheet 9 can prevent easy transfer of heat to superconducting wire 3 and thus suppress quenching.

Cured resin fiber sheets 9 adjacent to each other as they are disposed in layers are bonded together only at an end portion thereof in the direction along the winding axis of the superconducting coil (i.e., direction DR1), and entry of adhesive resin 5 between cured resin fiber sheets 9 can be suppressed. This can suppress bonding cured resin fiber sheets 9 together by adhesive resin 5 and keep small adhesive strength between cured resin fiber sheets 9. When cooling stress or electromagnetic stress acts in the superconducting coil and strain is generated in the superconducting coil, cured resin fiber sheets 9 can be easily peeled off from each other to release the strain and thus suppress accumulation of large strain energy in the superconducting coil. This can in turn suppress release of otherwise accumulated strain energy as heat resulting in quenching.

With cured resin fiber sheet 9 having its resin completely cured, if adhesive resin 5 enters between cured resin fiber sheets 9, small adhesive strength can be maintained between cured resin fiber sheets 9. When cooling stress or electromagnetic stress acts in the superconducting coil and strain is generated in the superconducting coil, cured resin fiber sheets 9 can be easily peeled off from each other to release the strain and thus suppress accumulation of large strain energy in the superconducting coil. This can in turn suppress release of otherwise accumulated strain energy as heat resulting in quenching.

Third Embodiment

Hereinafter, a superconducting coil according to a third embodiment will be described. The superconducting coil according to the third embodiment differs from superconducting coil 1 according to the first embodiment mainly in that the plurality of resin sheets further include a releasable sheet, and accordingly, any configuration similar to that of superconducting coil 1 according to the first embodiment will not be described repeatedly.

Figure 4:
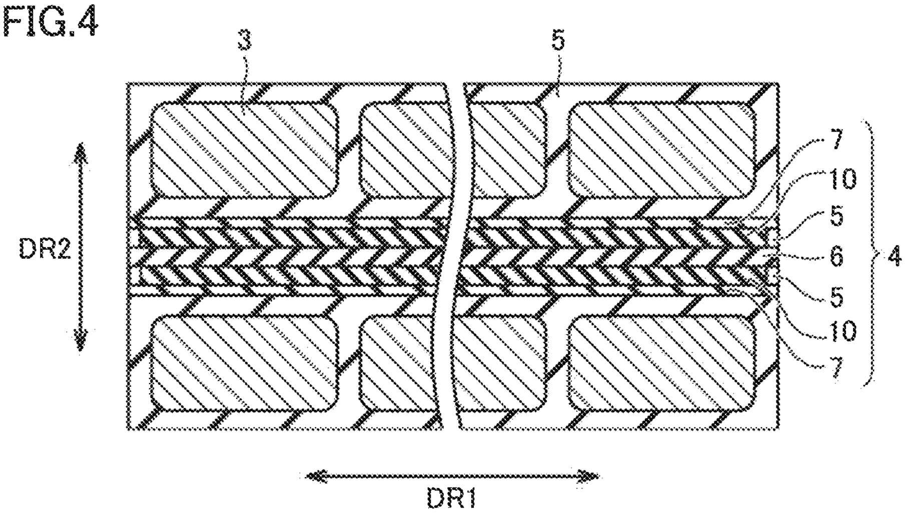
FIG. 4 is a longitudinal cross section of a configuration of an insulating sheet obtained by enlarging a portion between layers of a superconducting wire of a superconducting coil according to a third embodiment.

FIG. 4 is a longitudinal cross section of a configuration of an insulating sheet obtained by enlarging a portion between layers of a superconducting wire of the superconducting coil according to the third embodiment. In the present embodiment, the plurality of resin sheets further include a releasable sheet 10. Specifically, the plurality of resin sheets include one plastic sheet 6 and two releasable sheets 10. Note, however, that releasable sheet 10 is not limited to two in number, and it may be one releasable sheet 10.

As described above, in the present embodiment, insulating sheet 4 includes one plastic sheet 6, two releasable sheets 10 disposed in layers with plastic sheet 6 disposed therebetween, and two semi-cured resin fiber sheets 7 disposed in layers with two releasable sheets 10 disposed therebetween. That is, two releasable sheets 10 are each adjacent to a corresponding one of two semi-cured resin fiber sheets 7. Two semi-cured resin fiber sheets 7 constitute opposite outer surface layers of insulating sheet 4.

Releasable sheet 10 is formed for example of fluorocarbon resin. The fluorocarbon resin is, for example, Teflon (registered trademark). Releasable sheet 10 is, for example, several tens μm in thickness.

As shown in FIG. 4, in the direction along the winding axis of the superconducting coil (i.e., direction DR1), releasable sheet 10 is smaller in width than each of plastic sheet 6 and two semi-cured resin fiber sheets 7.

When adhesive resin 5 cures, plastic sheet 6 and semi-cured resin fiber sheet 7 disposed in layers with releasable sheet 10 disposed therebetween are bonded together by adhesive resin 5 only at an end portion of sheets 6 and 7 in the direction along the winding axis of the superconducting coil (i.e., direction DR1).

For the superconducting coil of the third embodiment, releasable sheet 10 is disposed adjacent to plastic sheet 6, and small adhesive strength can be maintained between plastic sheet 6 and releasable sheet 10. When cooling stress or electromagnetic stress acts in the superconducting coil and strain is generated in the superconducting coil, plastic sheet 6 and releasable sheet 10 can be easily peeled off from each other to release the strain and thus suppress accumulation of large strain energy in the superconducting coil. This can in turn suppress release of otherwise accumulated strain energy as heat resulting in quenching.

The width of releasable sheet 10 in the direction along the winding axis of the superconducting coil (i.e., direction DR1) is smaller than the width of each of plastic sheet 6 and two semi-cured resin fiber sheets 7 in the same direction, and plastic sheet 6 and semi-cured resin fiber sheet 7 disposed in layers with releasable sheet 10 disposed therebetween can be bonded together by adhesive resin 5 only at an end portion of sheets 6 and 7 in the direction along the winding axis of the superconducting coil (i.e., direction DR1).

Fourth Embodiment

Hereinafter, a superconducting coil according to a fourth embodiment will be described. The superconducting coil according to the fourth embodiment differs from the superconducting coil according to the second embodiment mainly in that the plurality of resin sheets further include a releasable sheet, and accordingly, any configuration similar to that of the superconducting coil according to the second embodiment will not be described repeatedly.

Figure 5:
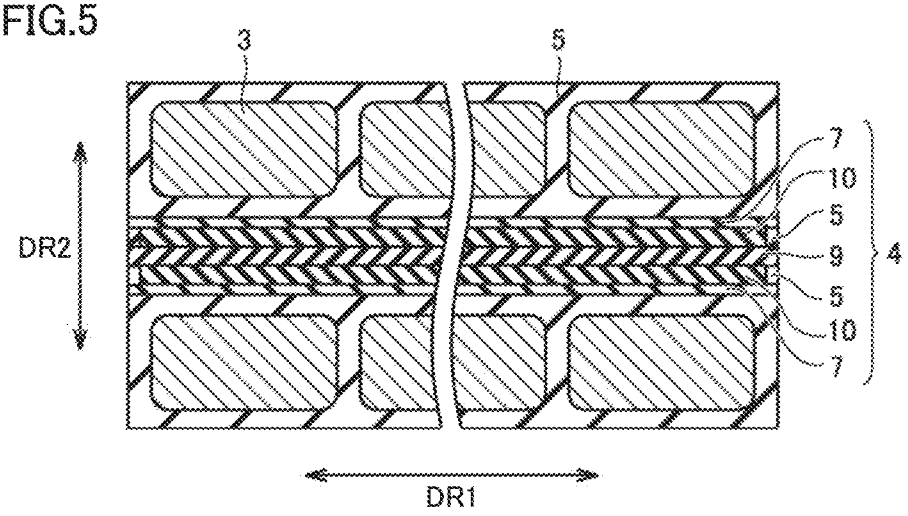
FIG. 5 is a longitudinal cross section of a configuration of an insulating sheet obtained by enlarging a portion between layers of a superconducting wire of a superconducting coil according to a fourth embodiment.

FIG. 5 is a longitudinal cross section of a configuration of an insulating sheet obtained by enlarging a portion between layers of a superconducting wire of the superconducting coil according to the fourth embodiment. In the present embodiment, the plurality of resin sheets further include releasable sheet 10. Specifically, the plurality of resin sheets include one cured resin fiber sheet 9 and two releasable sheets 10. Note, however, that releasable sheet 10 is not limited to two in number, and it may be one releasable sheet 10.

As described above, in the present embodiment, insulating sheet 4 includes one cured resin fiber sheet 9, two releasable sheets 10 disposed in layers with cured resin fiber sheet 9 disposed therebetween, and two semi-cured resin fiber sheets 7 disposed in layers with two releasable sheets 10 disposed therebetween. That is, two releasable sheets 10 are each adjacent to a corresponding one of two semi-cured resin fiber sheets 7. Two semi-cured resin fiber sheets 7 constitute opposite outer surface layers of insulating sheet 4.

As shown in FIG. 5, in the direction along the winding axis of the superconducting coil (i.e., direction DR1), releasable sheet 10 is smaller in width than each of cured resin fiber sheet 9 and two semi-cured resin fiber sheets 7.

When adhesive resin 5 cures, plastic sheet 6 and semi-cured resin fiber sheet 7 disposed in layers with releasable sheet 10 disposed therebetween are bonded together by adhesive resin 5 only at an end portion of sheets 6 and 7 in the direction along the winding axis of the superconducting coil (i.e., direction DR1).

For the superconducting coil of the fourth embodiment, releasable sheet 10 is disposed adjacent to cured resin fiber sheet 9, and small adhesive strength can be maintained between cured resin fiber sheet 9 and releasable sheet 10. When cooling stress or electromagnetic stress acts in the superconducting coil and strain is generated in the superconducting coil, cured resin fiber sheet 9 and releasable sheet 10 can be easily peeled off from each other to release the strain and thus suppress accumulation of large strain energy in the superconducting coil. This can in turn suppress release of otherwise accumulated strain energy as heat resulting in quenching.

The width of releasable sheet 10 in the direction along the winding axis of the superconducting coil (i.e., direction DR1) is smaller than the width of each of cured resin fiber sheet 9 and two semi-cured resin fiber sheets 7 in the same direction, and cured resin fiber sheet 9 and semi-cured resin fiber sheet 7 disposed in layers with releasable sheet 10 disposed therebetween can be bonded together by adhesive resin 5 only at an end portion of sheets 7 and 9 in the direction along the winding axis of the superconducting coil (i.e., direction DR1).

It should be construed that the embodiments disclosed herein are given by way of illustration in any respect, not by way of limitation. Therefore, the scope of the present disclosure should not be construed according to the above embodiments alone. Further, any modification within the meaning and scope equivalent to the terms of the claims is encompassed. In the description of the embodiments described above, configurations that can be combined together may be done so.

REFERENCE SIGNS LIST

1 superconducting coil, 2 winding frame, 3 superconducting wire, 4 insulating sheet, 5 adhesive resin, 6 plastic sheet, 7 semi-cured resin fiber sheet, 8 adhesive portion, 9 cured resin fiber sheet, 10 releasable sheet.

The invention claimed is:

1. A superconducting coil comprising:
- a superconducting wire wound by a plurality of turns and in a plurality of layers;
- an insulating sheet disposed across the plurality of turns of the superconducting wire between the layers of the superconducting wire; and
- an adhesive resin introduced to be cured between the superconducting wire and the insulating sheet, wherein
- the insulating sheet includes a plurality of resin sheets having electrical insulation and disposed in at least two layers, and two semi-cured resin fiber sheets disposed in layers with the plurality of resin sheets disposed therebetween,
- the two semi-cured resin fiber sheets are fully cured along with curing of the adhesive resin, and the adhesive resin and the two semi-cured resin fiber sheets are adhered to each other, and
- the plurality of resin sheets and the two semi-cured resin fiber sheets having mutually adjacent resin and semi-cured resin fiber sheets are bonded together.

2. The superconducting coil according to claim 1, wherein the plurality of resin sheets include a plastic sheet.

3. The superconducting coil according to claim 2, wherein the plurality of resin sheets include a plurality of the plastic sheets disposed in layers and thus adjacent to one another, and the plurality of plastic sheets, at a portion thereof having plastic sheets in contact with one another as the plastic sheets are disposed in layers, have fluorocarbon resin applied thereto.

4. The superconducting coil according to claim 2, wherein among the plurality of resin sheets disposed in at least two layers, two adjacent resin sheets are bonded together only at an end portion thereof in a direction along a winding axis of the superconducting coil.

5. The superconducting coil according to claim 2, wherein the plurality of resin sheets further include a releasable sheet, and the releasable sheet is adjacent to a corresponding one of the two semi-cured resin fiber sheets.

6. The superconducting coil according to claim 5, wherein the resin sheet and the semi-cured resin fiber sheet disposed in layers with the releasable sheet disposed therebetween are bonded together only at an end portion of the resin and semi-cured resin fiber sheets in a direction along a winding axis of the superconducting coil.

7. The superconducting coil according to claim 6, wherein, in the direction along the winding axis of the superconducting coil, the releasable sheet is smaller in width than each of the resin sheet and the semi-cured resin fiber sheet bonded together only at the end portion of the resin and semi-cured resin fiber sheets.

8. The superconducting coil according to claim 1, wherein the plurality of resin sheets include a cured resin fiber sheet.

9. The superconducting coil according to claim 8, wherein among the plurality of resin sheets disposed in at least two layers, two adjacent resin sheets are bonded together only at an end portion thereof in a direction along a winding axis of the superconducting coil.

10. The superconducting coil according to claim 8, wherein the plurality of resin sheets further include a releasable sheet, and the releasable sheet is adjacent to a corresponding one of the two semi-cured resin fiber sheets.

11. The superconducting coil according to claim 10, wherein the resin sheet and the semi-cured resin fiber sheet disposed in layers with the releasable sheet disposed therebetween are bonded together only at an end portion of the resin and semi-cured resin fiber sheets in a direction along a winding axis of the superconducting coil.

12. The superconducting coil according to claim 11, wherein, in the direction along the winding axis of the superconducting coil, the releasable sheet is smaller in width than each of the resin sheet and the semi-cured resin fiber sheet bonded together only at the end portion of the resin and semi-cured resin fiber sheets.

13. The superconducting coil according to claim 1, wherein the plurality of resin sheets further include a releasable sheet, and the releasable sheet is adjacent to a corresponding one of the two semi-cured resin fiber sheets.

14. The superconducting coil according to claim 13, wherein the resin sheet and the semi-cured resin fiber sheet disposed in layers with the releasable sheet disposed therebetween are bonded together only at an end portion of the resin and semi-cured resin fiber sheets in a direction along a winding axis of the superconducting coil.

15. The superconducting coil according to claim 14, wherein, in the direction along the winding axis of the superconducting coil, the releasable sheet is smaller in width than each of the resin sheet and the semi-cured resin fiber sheet bonded together only at the end portion of the resin and semi-cured resin fiber sheets.

16. The superconducting coil according to claim 1, wherein among the plurality of resin sheets disposed in at least two layers, two adjacent resin sheets are bonded together only at an end portion thereof in a direction along a winding axis of the superconducting coil.

* * * * *